June 10, 1952     R. C. STEWART     2,599,592
TRACTION DEVICE FOR TRACK LAYING VEHICLES
Filed June 5, 1951     7 Sheets-Sheet 2

INVENTOR.
RICHARD C. STEWART
BY
ATTORNEYS

June 10, 1952

R. C. STEWART 2,599,592

TRACTION DEVICE FOR TRACK LAYING VEHICLES

Filed June 5, 1951

INVENTOR.
RICHARD C. STEWART
BY
ATTORNEYS

Patented June 10, 1952

2,599,592

UNITED STATES PATENT OFFICE 2,599,592

TRACTION DEVICE FOR TRACK LAYING VEHICLES

Richard C. Stewart, Oxnard, Calif.

Application June 5, 1951, Serial No. 230,017

16 Claims. (Cl. 305—9)

(Granted under the act of March 3, 1883, as amended April 30, 1928; 370 O. G. 757)

The invention described herein may be manufactured and used by or for the Government for governmental purposes, without payment to me of any royalty thereon.

This invention relates to track laying vehicles and more particularly to an improved grouser or track plate adapted to be positioned so as to provide increased traction for the track, the invention also including means for so positioning the track plate, the said means being operable at will from the driver's compartment.

Track laying vehicles heretofore have employed grousers or track plates having appendages adapted to extend into and engage the surface over which the vehicle is moving in order to afford greater traction than is available from unmodified track plates. These modified track or tread plates are necessary in traversing unusually soft or fluent terrain such as muddy or boggy ground, sand, and the like. However, these track plates are objectionable for travel over hard surface roads, chiefly because of the damage they inflict upon such surface. In addition, such track members are less desirable for use on hard surface roads inasmuch as they do not grip the road as well as unmodified track, thus necessitating a reduced rate of travel over this type of road surface. Furthermore, the maneuverability of the grouser-equipped vehicle on a hard surface roadway is also less than where the same vehicle is equipped with unmodified tread plates.

In the past, grouser plates have been provided which could be attached or detached when a particular type of terrain was encountered. This provision, however, required the operator to dismount from the vehicle and expend considerable time and effort in attaching or removing the plates from the track of his vehicle.

Accordingly, it is an object of the present invention to provide a device for improving the traction of a track laying vehicle, which device may be operated at will from the driver's compartment.

A further object of the invention is the provision of a modified grouser or track plate for use with the track of a track laying vehicle, and means operable from the driver's compartment to extend the modified track plate into operative position for additional engagement with the ground and to retract the said plate from the operative position.

A still further object of the invention is the provision of a modified track plate for a track laying vehicle and an actuator therefor adapted to be positioned on the track roller and including operating means for the actuator operable from the driver's compartment.

These and other objects of the invention will become apparent from the following description taken in conjunction with the accompanying drawings in which:

Fig. 3 is a section on the line 3—3 of Fig. 2;

Fig. 13 is a fragmentary plan view partly in section illustrating a torsion spring and the mounting therefor;

Referring to the drawings, one side of a track laying vehicle 10 is illustrated having a main frame 11, a driver's compartment 12, and a track frame 13 attached to the main frame. A sprocket 14 of the final drive assembly extends from the side of the vehicle and a front idler wheel 15, a top idler 16, and a plurality of rollers 17 are provided to support the vehicle and drive track 18 engaged therewith.

Figures 11, 12, 14, 15:
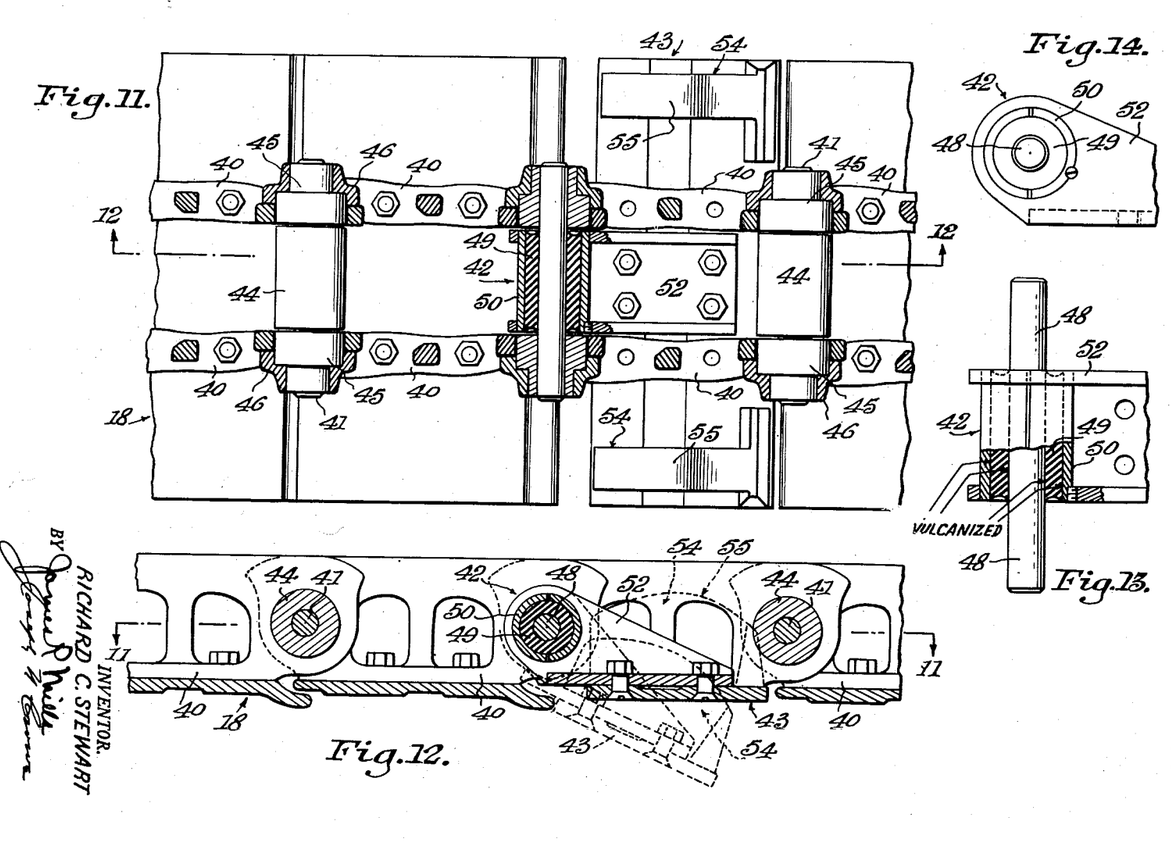
Fig. 11 is a section on the line 11—11 of Fig. 12 showing the details of a section of track including a track plate constructed in accordance with the present invention.
Fig. 12 is a section on the line 12—12 of Fig. 11.
Fig. 14 is a side elevation of the device of Fig. 13.
Fig. 15 is a plan view of a side frame of the tractor which carries a track and operating means for the track plate.
Figure 15:
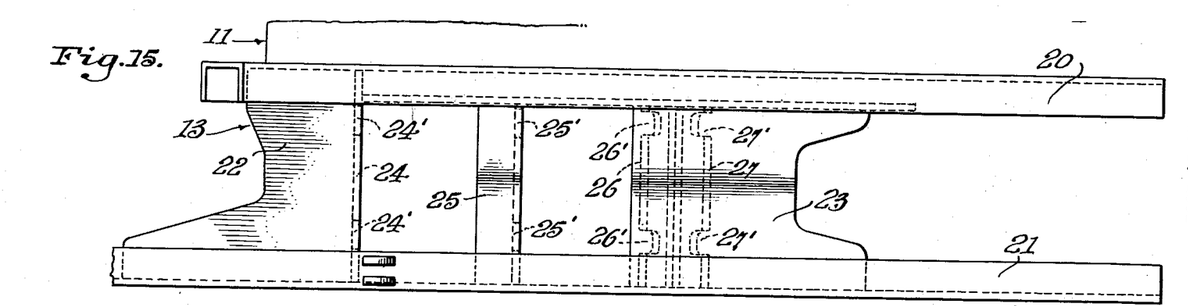
Figure 16:
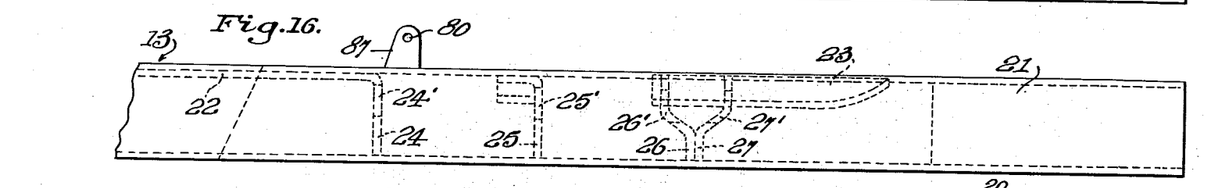
Fig. 16 is a side elevation of the device of Fig. 15.
Figures 17, 18:
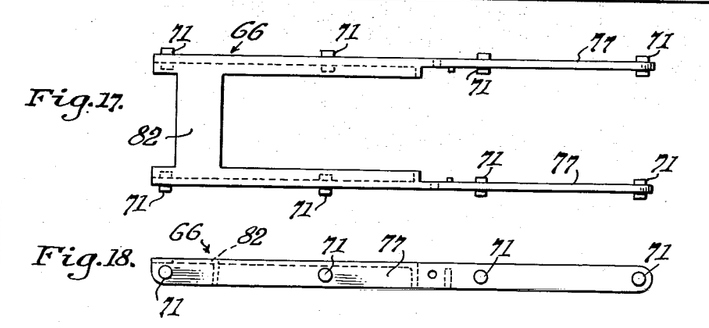
Fig. 17 is a plan view of the crank actuator.
Fig. 18 is a side elevation of the device of Fig. 17.

Referring particularly to Figs. 15 and 16, the track frame 13 provided at each side of the vehicle includes spaced channel members 20 and 21 having connecting members 22 and 23 at the rear and forward portions, respectively, of the frame. Transverse web members 24, 25, 26, and 27 are provided to add rigidity to the frame.

The front idler wheel 15 is rotatably mounted by a bracket 29 at the forward portion of the frame, and the sprocket 14 is attached to the frame by a bracket 30 at the rearward portion thereof. The idler 16 is rotatably mounted above the central portion of the frame by an arm 32 attached thereto. Although a single idler is shown, it is, of course, understood that one or more may be employed, and the invention is not limited to any particular type or size of track laying vehicle, tractors, tanks, gun carriers, and other types of track laying vehicles being within the scope of the invention.

The rollers 17 are rotatably mounted in spaced relation between the channel members 20 and 21. The rollers are of conventional construction, each including a hub portion 33 and rim portions 34 on either side of the hub, the rim portions each having a cylindrical surface 35 for engaging the track. Suitable anti-friction means (not shown) mount each roller on a pin 36 having flattened end portions 37 supported against the lower portion of the channel members 20 by a bearing cap 38. While the tracked vehicle illustrated is provided with four rollers which are adapted to carry the weight of the vehicle it is understood that the invention is not limited to the specific number or structure of the rollers shown but includes reasonable variations therefrom. It is apparent that the rollers may be easily attached to or removed from the frame after loosening or disengagement of the track adjacent to a particular roller and the removal of the bearing caps 38 from each end of the pins 36 on which the rollers are mounted.

Referring particularly to Fig. 11, the track 18 includes a plurality of spaced links 40 pivotally connected by pins 41. The track is of conventional construction except for the connector 42, shown in section in Fig. 11, and the modified track plate 43 attached thereto. The pin 41 of the conventional structure is pressfitted into a spacer 45 which is similarly pressfitted into a sleeve 46 at each end of the pin, a bushing 44 being mounted on the pin between the sides of the track. In the modified construction, a track pin 48 has vulcanized to it a torus of rubber or other suitable resilient member 49, and a sleeve 50 is vulcanized to the outer surface of the torus. A bracket 52 is attached to the sleeve 50 and has mounted on it the track plate 43. The track plate 43 has at either side an upstanding cam member 54 with a curved surface 55. It is apparent that rotation of the track plate 43 about the axis of the pin 48, as diagrammatically illustrated in Fig. 12, will be resisted by the torus 49 whose inner and outer cylindrical surfaces are vulcanized, respectively, to the pin 48 and the sleeve 50. In order to normally urge the track plate to the position shown in full lines in Fig. 12, the torsion spring assembly has an initial clockwise wind-up, as viewed in Fig. 12, of approximately 3°.

In order to move the modified track plates from normal to extended position there is provided a plurality of crank arms 60, one being journaled at each side of a roller 17. Each crank arm has a larger substantially circular portion 64 mounted on a hub 33 of a roller 17 by an adapter bushing 61 which is pressfitted onto the hub, the bushing 61 providing a bearing surface for the inner bearing surface 62 of the crank arm. The circular portion 64 of each of the crank arms has a pair of spaced ears 63 on the periphery thereof which are provided with oppositely disposed and aligned notches 63'. Each crank arm also has a smaller or crank end which has a transverse post 65 on which a crank arm roller 67 is journaled by means of a bushing 68 provided with a retaining seal 69. A retainer 70 is attached to the end of the post 65 by suitable fasteners 72, and a cap plate 73 is attached by fasteners 74 to the roller 67. The ears 63 are disposed at an angle to the main axis of the crank, the crank having longer and shorter arms like a bell crank. Suitable oil grooves 65' and a grease fitting 65" are provided in the post 65 and crank arm 64 in order to afford lubrication for the crank arm roller 67.

It is contemplated that the crank arms will be assembled to a roller prior to attachment of the pins carrying the rollers to the underside of the frame, the crank arm being sufficiently narrow in width to permit positioning the rollers between the sides of the roller portion of the frame and withdrawal therefrom. In order to oscillate the crank arms about their axes, an actuator member 66 is provided comprising parallel elongated members 77 joined by a web 82 and having a plurality of spaced posts 71 disposed along the length of the members 77. Each of the posts 71 is adapted to engage the notches 63' in a pair of ears 63 associated with a crank arm. Actuator member 66 is carried by the posts resting in the notches, and its members 77 extend through openings 24', 25', 26', and 27' in the respective web members of the track frame 13.

Figures 19, 20:
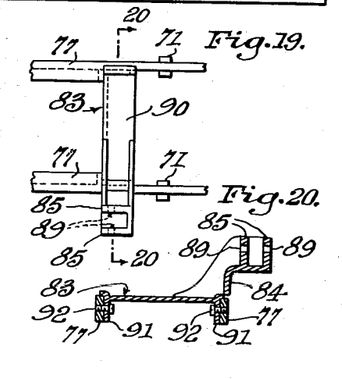
Fig. 19 is a plan view of a portion of the actuator of Figs. 17 and 18 and including the bracket mounting for the piston rod.
Fig. 20 is a section on the line 20—20 of Fig. 19.

Mounted on top of each of the outside channel members 21 of the track frame members 13, is a hydraulic piston and cylinder assembly 75, having a piston rod 76. The stationary portion of the cylinder assembly is pivotally mounted on the frame by means of a pin 78 passing through a projection 79 at the rear of the cylinder assembly and through apertures 80 in upstanding bracket 81 secured to the top of the outside channel member 21. The piston rod 76 is pivotally engaged with a tie bracket 83 (Fig. 20) having an offset arm 84 with upstanding members 85 thereon between which a piston rod engaging member 87 is received, a pin 88 passing through apertures 89 in the members 85 and the member 87. The tie bracket 83 has a main channel portion 90 whose flanges 91 are connected to the members 77 of the actuator 66 by suitable fasteners 92.

In order to actuate the cylinder and piston rod assembly 75, hydraulic lines 96 extend to a control 97 in the driver's compartment 12, suitable means (not shown) being provided to force hydraulic fluid into the lines at the desired pressure.

Although in the drawing a total of five track plates with cam surfaces are shown on the track of the vehicle, fewer or more may be employed as desired. I have found, however, that the use of the number shown provides substantial advantages and greatly increases the pulling power of the vehicle.

In the operation of the device the operator may leave the crank arms 60 in raised position while travelling over hard surfaced roadways or other terrain for which the unmodified track is satisfactory. Upon reaching land or terrain the surface of which is sandy or excessively soft and where additional traction is required, the operator, through the operation of the valve 97 in the driver's compartment 12, may admit fluid under pressure through a line 96 to the hydraulic cylinder 75 in order to extend the piston 76 therefrom. Movement of the piston 76 to the right, as viewed in Fig. 1, moves the tie bracket 83 and the attached actuator 66 to the right, the actuator passing through the openings 24', 25', 26', and 27' in the web members of the track frame 13.

Figure 1:
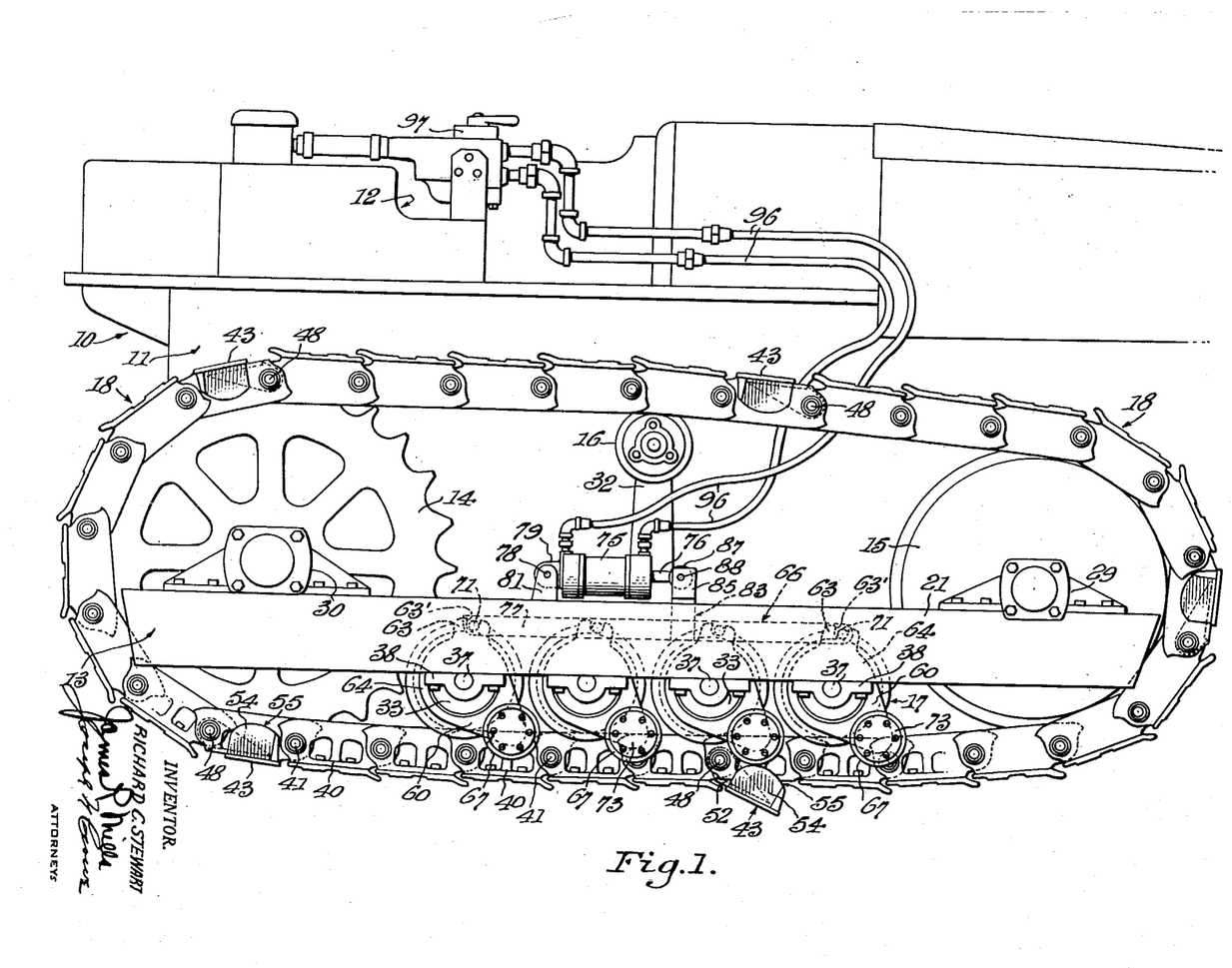
Fig. 1 is a side elevation of a tractor having an embodiment of the present invention mounted thereon.
Figure 2:
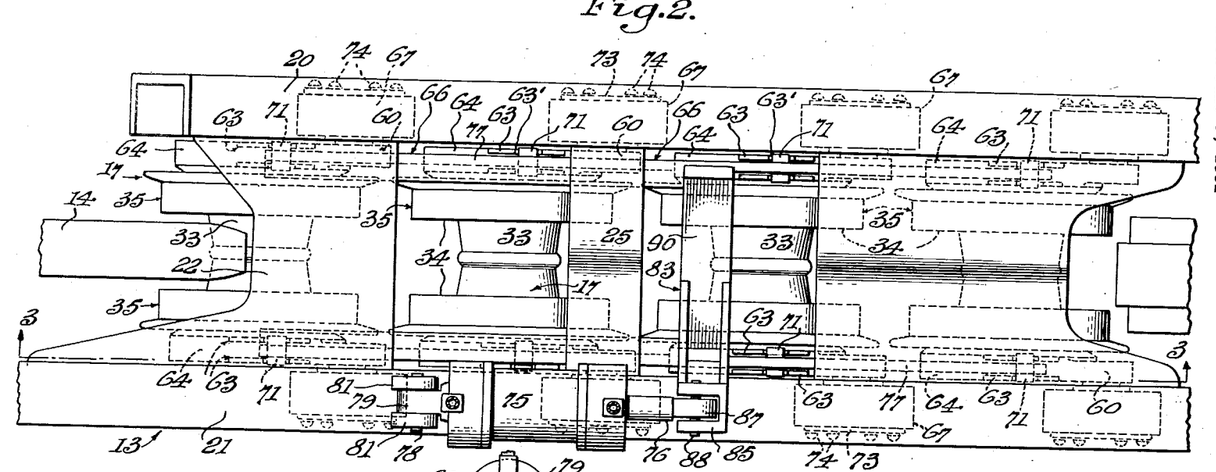
Fig. 2 is a plan view of a portion of the lower part of the track assembly of Fig. 1.
Figure 4:
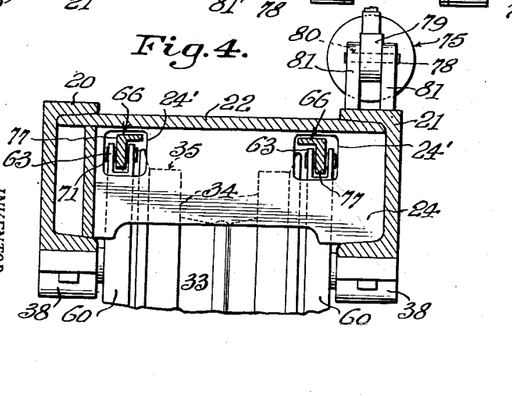
Fig. 4 is a section on the line 4—4 of Fig. 3.
Figure 5:
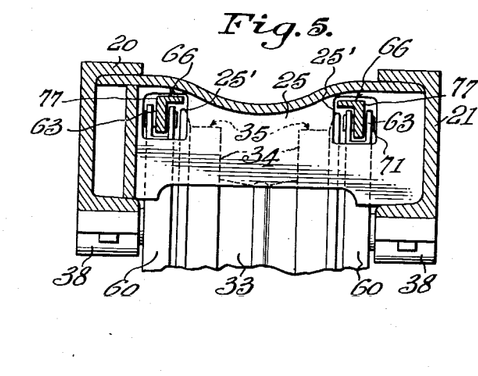
Fig. 5 is a section on the line 5—5 of Fig. 3.
Figures 5, 9, 10:
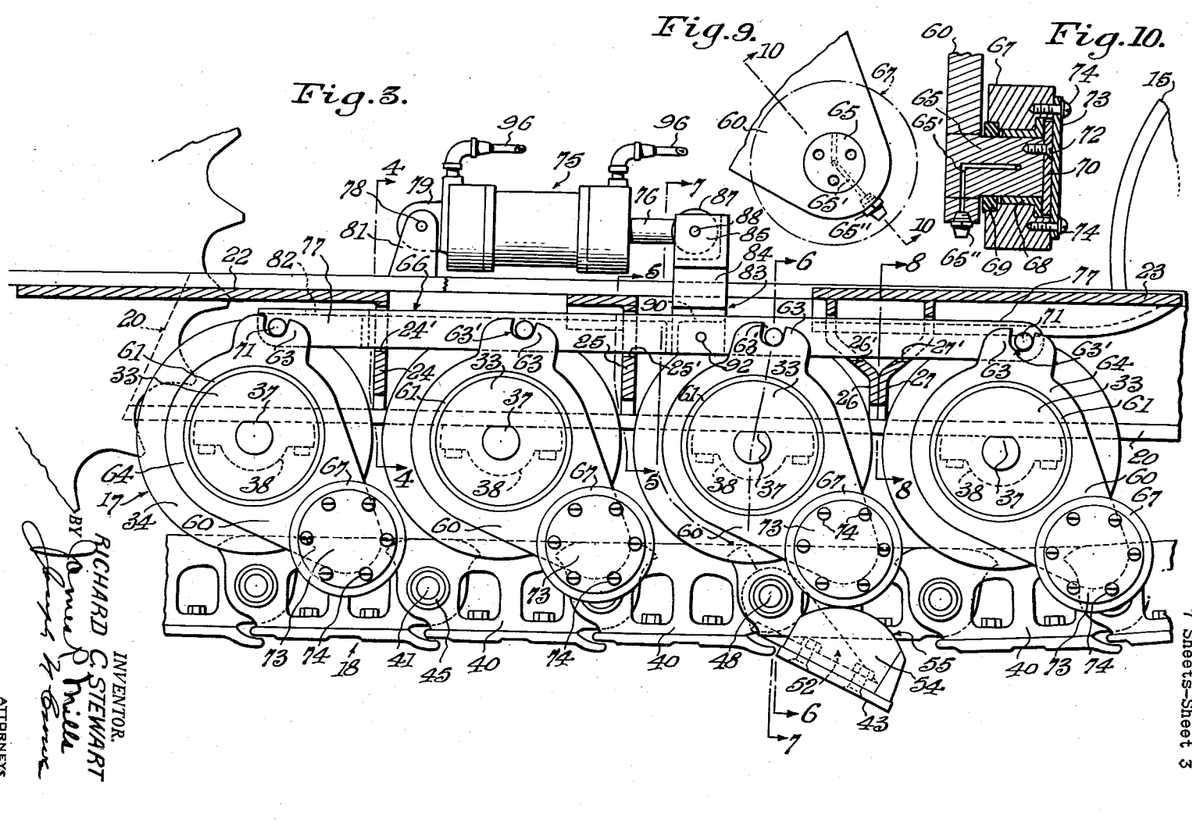
Fig. 9 is a side elevation partly in section of the smaller end of a crank arm, the roller being omitted for clarity.
Fig. 10 is a section on the line 10—10 of Fig. 9 and including the roller.
Figure 6:
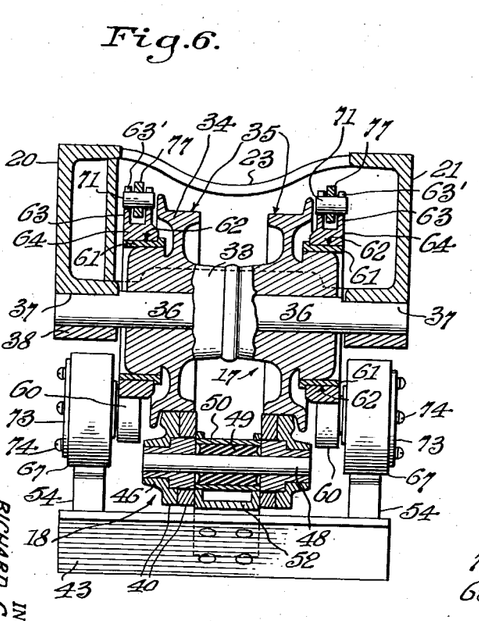
Fig. 6 is a section on the line 6—6 of Fig. 3.
Figure 7:
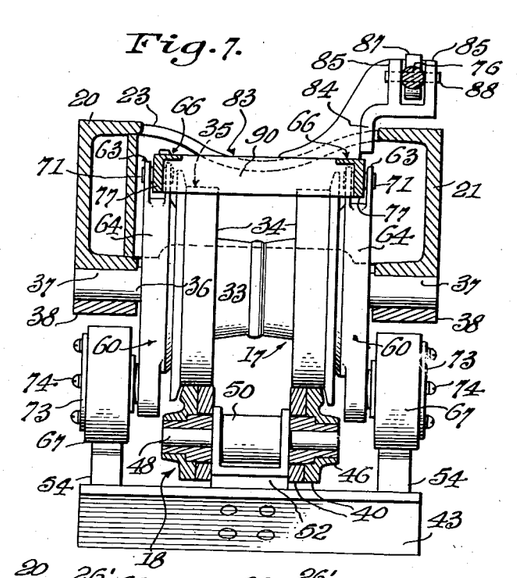
Fig. 7 is a section on the line 7—7 of Fig. 3.
Figure 8:
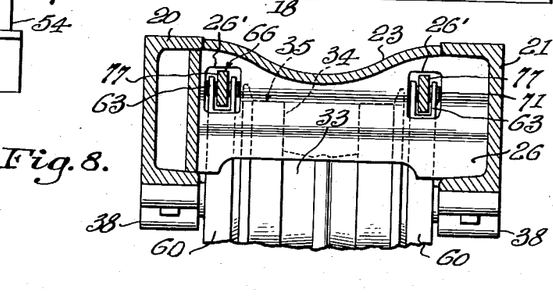
Fig. 8 is a section on the line 8—8 of Fig. 3.

The notches of each of the pairs of ears 63 are engaged with a post 71 extending through the elongated members 77 of the actuator; hence, movement of the actuator toward the right produces a clockwise torque on the cranks 60, thus causing their rotation from raised position to a lowered position as shown in Figs. 1 and 3.

In the raised position the crank arm rollers 67 are so positioned that as a cam portion 54 of the track plates 43 passes underneath the crank arm rollers there is no contact or engagement therebetween. When in the lowered position, however, the crank arm rollers, which are positioned in the path of the approaching cam members 54 of the track plates, engage the cam surfaces thereof, thus forcing the track plates to rotate clockwise about the pin 48 to the position shown in Figs. 1 and 3.

As previously described, the resilient torus 49, which is vulcanized to and positioned between the pin 48 and the sleeve 50 to which the track plate bracket 52 is attached, is connected to the track with an initial clockwise wind-up of a few degrees in order that the individual track plate will normally be retained in alignment with the main body of the track. The clockwise rotation of the modified track plate produced by the cam action of the crank arm roller produces a further wind-up of the torus 49, and hence in the embodiment shown, as soon as the cam member 54 of a track plate passes out of engagement with the lowered crank arm roller 67, the track plate will be raised to its normal position. After engagement with the last crank arm roller in a cycle the modified track plate will be maintained in normal position until its cam member again engages the most forward crank arm roller.

Figure 21:
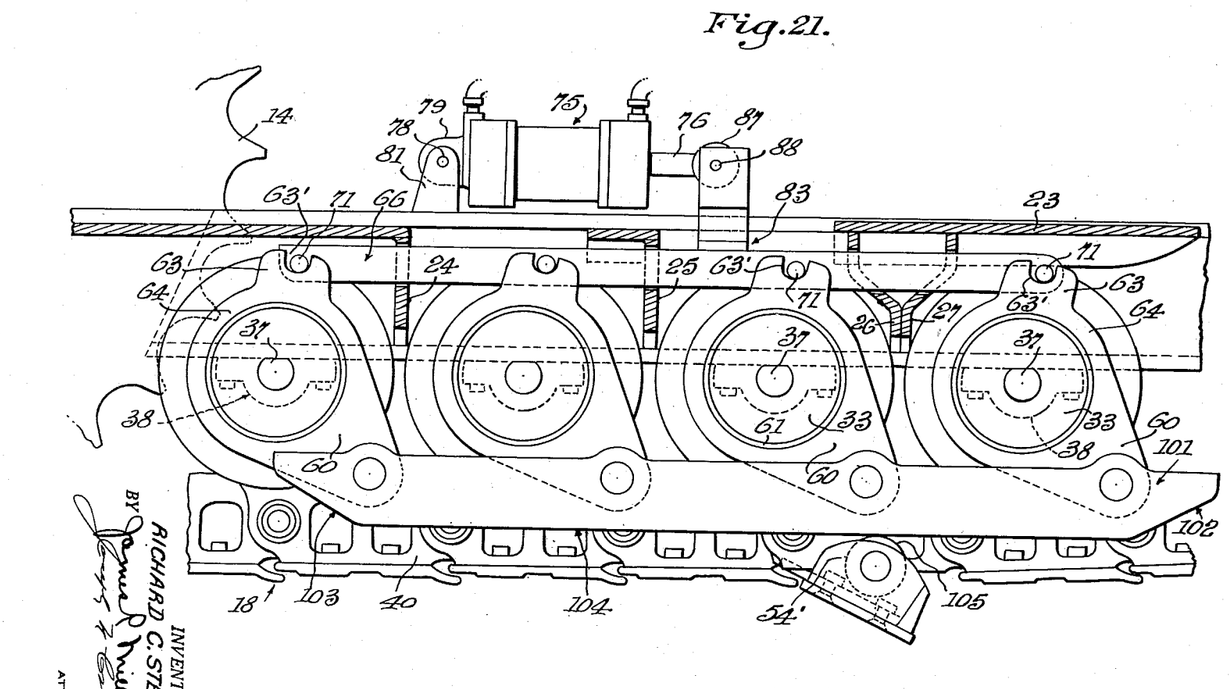
Fig. 21 is a side elevation similar to Fig. 3 illustrating a modified form of the invention.

In the modification of Fig. 21, an elongated cam actuator member 101 is pivotally connected to the lower portions of the crank arms instead of providing an individual lower crank arm roller for each crank arm as in the preceding embodiment. The cam actuator member has inclined leading and trailing surfaces 102 and 103 connected by a main actuating surface 104. In order to reduce the friction which would otherwise be caused by the sliding engagement between the cam surfaces of the track plates and the surface 104 of the actuator 101, rollers 105 are journaled adjacent to, and just inside, each of the upstanding members 54' of the modified track plates. The rollers preferably extend above the central portion of the upstanding members 54'.

In the operation of the modified form of the device the leading inclined edge 102 engages the roller 105 of a modified track plate, thus causing the plate to rotate to the position shown in Fig. 21, the track plate being held in this extended position during the entire time that the member 101 is passing thereover.

It will be understood that the operation of the various elements of Fig. 21 is similar to that of the other form of the invention. Briefly, fluid pressure within the hydraulic cylinder 75 extends the piston 76 and the attached bracket and actuator 66 toward the right, thus producing clockwise rotation of the crank arms to the position shown, the actuator 101 being lowered as the actuator is moved toward the right, thus positioning the member 101 where it will engage the rollers 105 of the modified track plates as the track carrying such track plates passes therebeneath.

In using the device, the operator may extend the modified track plates for use over difficult terrain, and upon reaching a hard surface may retract them at will without leaving the driver's compartment or slowing the progress of the vehicle.

Accordingly, it is apparent that the invention includes a modified track plate having a pair of cam surfaces, one for each side of the track, the cam surfaces being adapted for engagement by the roller of a crank arm journaled on a track roller and operated by an actuator which may be controlled by hydraulic means or the like from the driver's compartment. Although a hydraulic actuator has been shown, it is apparent that other operating means such as an electric solenoid may be employed. In the modified form, an actuator member is attached to the lower portion of the crank arms, and the cam members of the track plates are provided with rollers for engagement therewith.

It will be obvious to those skilled in the art that the invention is not limited to the particular embodiment shown, but that reasonable variations therefrom are within the scope of the invention, and, therefore, the invention is not limited by the specific construction shown but only as appears in the appended claims.

Having thus described my invention, what I claim as new and wish to secure by Letters Patent is:

1. A track laying vehicle comprising a main frame, a power unit and controls therefor, drive instrumentalities including a drive sprocket adapted to be driven by the power unit, a track frame having opposite ends and attached to and adapted to support the vehicle, a main idler wheel rotatably mounted near one end of the track frame, the opposite end of the track frame being mounted adjacent to the sprocket, idler means mounted near the upper portion of the track frame, and roller means mounted at the lower portion of the track frame, an endless track engaged with the sprocket, the main idler wheel, the idler means and the roller means, the endless track including track plate means oscillatably mounted on said track, the mounting for the track plate means including means normally urging said plate means into alignment with said track, the plate means having an upstanding rib with a cam surface, a crank arm journaled on said roller means, each crank arm having a roller at its extremity adapted to engage the cam surface of a track plate means as the portion of the track carrying the plate passes adjacent the crank arm roller, an actuator member pivotally engaging each crank arm and adapted to oscillate said arm, a hydraulic cylinder mounted on the track frame, said cylinder having a piston rod adapted to be actuated by fluid pressure within the cylinder, means pivotally connecting said piston rod to said actuator member, and means for actuating and controlling the hydraulic cylinder.

2. In a track laying vehicle, a track frame attached to and adapted to support the vehicle, and a plurality of rollers mounted at the lower portion of the track frame, an endless track engaged with the rollers, one or more track plates oscillatably mounted on said track, said mounting including means normally urging each said plate into alignment with said track, each plate having an upstanding rib with a cam surface, a crank arm journaled on one or more of said rollers, each crank arm having a roller at its extremity adapted to engage the cam surface of a track plate as the portion of the track carrying the plate passes adjacent the crank arm roller, an actuator member pivotally engaging each crank arm and adapted to oscillate said arm, a hydraulic cylinder mounted on the track frame, said cyinder having a piston rod adapted to be actuated by fluid pressure within the cylinder, means pivotally connecting said piston rod to said actuator member, and means for actuating and controlling the hydraulic cylinder.

3. In a track laying vehicle, a track frame attached to and adapted to support the vehicle, and a plurality of rollers mounted at the lower portion of the frame, an endless track engaged with the rollers, one or more track plates oscillatably mounted on said track, means normally retaining each said plate in alignment with said track, each plate having an upstanding rib with a cam surface, a crank arm journaled on one or more of said rollers, each crank arm having a roller at its extremity adapted to engage the cam surface of a track plate as the portion of the track carrying the plate passes adjacent the crank arm roller, an actuator member engaging each crank arm and adapted to oscillate said arm, a hydraulic cylinder mounted on the track frame, said cylinder having a piston rod adapted to be actuated by fluid pressure within the cylinder, means connecting said piston rod to said actuator member, and means for actuating and controlling the hydraulic cylinder.

4. For use with a track laying vehicle having an endless track, one or more track plates oscillatably mounted on said track, means normally urging each said plate into alignment with said track, each plate having a cam surface, one or more crank arms journaled adjacent said track, each crank arm having means at its extremity adapted to engage the cam surface of a track plate as the portion of the track carrying the plate passes adjacent the crank arm, an actuator member engaging each crank arm and adapted to oscillate said arm, a hydraulic cylinder mounted adjacent the track, said cylinder having a piston rod adapted to be actuated by fluid pressure within the cylinder, means connecting said piston rod to said actuator member, and means for actuating and controlling the hydraulic cylinder.

5. For use with a track laying vehicle having an endless track, one or more track plates oscillatably mounted on said track, means normally urging each said plate into alignment with said track, each plate having cam means, movable means adapted in one position to engage the cam means of a track plate as the portion of the track carrying the plate passes adjacent the movable means, an actuator member engaged with said movable means and adapted to move said means to and from operative position, and operating means for said actuator member.

6. The structure of claim 5, the means normally urging each said plate in alignment with said track comprising a pin non-rotatably mounted transversely of said track, a rubber torus vulcanized to the central portion of said pin, a sleeve vulcanized to the torus, and a bracket mounted on the sleeve and attached to the plate, said torus being placed under torsion in mounting the bracket thereon such that the plate is urged into alignment with said track.

7. The structure of claim 5, the means normally urging each said plate into alignment with said track comprising a pin non-rotatably mounted on said track, a resilient member rigidly attached to the pin, and a bracket rigidly attached to the resilient member and adapted to normally urge the plate into alignment with the track.

8. For use with a track laying vehicle having a track frame, a plurality of rollers mounted at the lower portion of the track frame, and an endless track engaged with the rollers, one or more track plates oscillatably mounted on said track, means normally urging each said plate into alignment with said track, each plate having cam means, crank arms journaled on a plurality of said rollers, an elongated member pivotally connected to the extremity of a plurality of crank arms and adapted to engage the cam means of a track plate as the portion of the track carrying the plate passes under the elongated member, an actuator member pivotally engaging each crank arm and adapted to oscillate said arm, and operating means for said actuator member.

9. For use with a track laying vehicle having an endless track, one or more track plates oscillatably mounted on said track, means normally urging each said plate into alignment with said track, each said plate having cam means, and an elongated member positioned adjacent to the track and adapted to engage the cam means of a track plate as the portion of the track carrying the said track plate passes under the elongated member.

10. The structure of claim 9, the cam means having antifriction means adapted to engage the elongated members.

11. For use with a track laying vehicle having an endless track, one or more track plates oscillatably mounted on said track, means normally maintaining each said plate in alignment with said track, each plate having a cam surface, and means adapted to engage the cam surface of a track plate as the portion of the track carrying the plate passes adjacent the said means in order to extend a portion of the plate out of alignment with the track.

12. For use with a track laying vehicle having and endless track, track plate means movably mounted on said track, means normally maintaining said track plate means in alignment with said track, and means adapted to engage the track plate means as the portion of the track carrying the track plate means passes adjacent the said means in order to extend a portion of the track plate means out of alignment with the track.

13. For use with a track laying vehicle having an endless track, grouser means mounted on said track, said grouser means being movable from retracted position to an extended position in which latter position said grouser means substantially protrude from alignment with the track, means normally holding said grouser means in alignment with said track, actuator means for moving said grouser means from retracted to extended position, and control means for operating said actuator means.

14. For use with a track laying vehicle having an endless track, grouser means mounted on said track, said grouser means being movable from retracted position to an extended position in which latter position said grouser means substantially protrude from alignment with the track, and central operating means for controlling the position of said grouser means.

15. For use with a track laying vehicle having an endless track for engaging terrain over which the vehicle passes, one or more track plates, means movably mounting said track plates on said track, said track plates each being adapted for increased engagement with the terrain when moved out of alignment with the track from normal position, said mounting means comprising fixed supporting instrumentalities connected to said track, track plate bracket means adjacent said supporting instrumentalities, and resilient means attached to said supporting instrumentalities and said bracket means.

16. The structure of claim 15, cam means on said track plates, and cam actuating means on the vehicle and adapted to engage the cam means.

RICHARD C. STEWART.

REFERENCES CITED

The following references are of record in the file of this patent:

FOREIGN PATENTS

| Number | Country | Date |
|---|---|---|
| 779,964 | France | Jan. 24 1935 |